United States Patent
Lessmann et al.

(10) Patent No.: US 10,452,999 B2
(45) Date of Patent: Oct. 22, 2019

(54) METHOD AND A DEVICE FOR GENERATING A CONFIDENCE MEASURE FOR AN ESTIMATION DERIVED FROM IMAGES CAPTURED BY A CAMERA MOUNTED ON A VEHICLE

(71) Applicant: Aptiv Technologies Limited, St. Michael (BB)

(72) Inventors: Stephanie Lessmann, Erkrath (DE); Mirko Meuter, Erkrath (DE); Jens Westerhoff, Dortmund (DE)

(73) Assignee: APTIV TECHNOLOGIES LIMITED (BB)

( * ) Notice: Subject to any disclaimer, the term of this patent is extended or adjusted under 35 U.S.C. 154(b) by 244 days.

(21) Appl. No.: 15/467,684

(22) Filed: Mar. 23, 2017

(65) Prior Publication Data

US 2017/0278014 A1    Sep. 28, 2017

(30) Foreign Application Priority Data

Mar. 24, 2016 (EP) .................................... 16162369

(51) Int. Cl.
| | |
|---|---|
| *G06N 20/00* | (2019.01) |
| *G06K 9/62* | (2006.01) |
| *G06K 9/66* | (2006.01) |
| *G06T 5/20* | (2006.01) |

(Continued)

(52) U.S. Cl.
CPC ......... *G06N 20/00* (2019.01); *G06K 9/00791* (2013.01); *G06K 9/6262* (2013.01); *G06K 9/6267* (2013.01); *G06K 9/66* (2013.01); *G06T 5/20* (2013.01); *G06T 7/269* (2017.01); *G06T 7/73* (2017.01); *G06T 2207/10016* (2013.01);

(Continued)

(58) Field of Classification Search
None
See application file for complete search history.

(56) References Cited

U.S. PATENT DOCUMENTS

2015/0036888 A1* 2/2015 Weisenburger ........... G06T 7/80
382/107

OTHER PUBLICATIONS

Roberts, R., Potthast, C. and Dellaert, F., Jun. 2009. Learning general optical flow subspaces for egomotion estimation and detection of motion anomalies. In Computer Vision and Pattern Recognition, 2009. CVPR 2009. IEEE Conference on (pp. 57-64). IEEE. (Year: 2009).*

(Continued)

*Primary Examiner* — Clifford Hilaire
(74) *Attorney, Agent, or Firm* — Lawrence D. Hazelton

(57) ABSTRACT

A method of generating a confidence measure for an estimation derived from images captured by a camera mounted on a vehicle includes: capturing consecutive training images by the camera while the vehicle is moving; determining ground-truth data for the training images; computing optical flow vectors from the training images and estimating a first output signal based on the optical flow vectors for each of the training images, the first output signal indicating an orientation of the camera; classifying the first output signal for each of the training images as a correct signal or a false signal depending on how good the first output signal fits to the ground-truth data; determining optical flow field properties for each of the training images derived from the training images; and generating a separation function that separates the optical flow field properties into two classes based on the classification of the first output signal.

25 Claims, 4 Drawing Sheets

(51) Int. Cl.
*G06K 9/00* (2006.01)
*G06T 7/73* (2017.01)
*G06T 7/269* (2017.01)

(52) U.S. Cl.
CPC .............. *G06T 2207/20081* (2013.01); *G06T 2207/30244* (2013.01); *G06T 2207/30252* (2013.01)

(56) References Cited

OTHER PUBLICATIONS

Geiger, Andreas, Philip Lenz, and Raquel Urtasun. "Are we ready for autonomous driving? the kitti vision benchmark suite." In Computer Vision and Pattern Recognition (CVPR), 2012 IEEE Conference on, pp. 3354-3361. IEEE, 2012. (Year: 2012).*

Martinez F, Manzanera A, Romero E. A motion descriptor based on statistics of optical flow orientations for action classification in video-surveillance. InMultimedia and Signal Processing 2012 (pp. 267-274). Springer, Berlin, Heidelberg. (Year: 2012).*

Oisin Mac Adoha, et al: "Learning a Confidence Measure for Optical Flow", vol. 3, No. 1, May 1, 2013, pp. 1107-1120.

Claudia Kondermann, et al.: "An Adaptive Confidence Measure for Optical Flows Based on Linear Subspace Projections", Sep. 12, 2007, pp. 132-141.

Ralf Haeusler, et al.: "Ensemble Learning for Confidence Measures in Stereo Vision", 2013 IEEE Conference on Computer Vision and Pattern Recognition, Jun. 23, 2013, pp. 305-312.

Bjorn Andres, et al.: "On Errors-In-Variables Regression With Arbitrary Covariance and Its Application to Optical Flow Estimation", Jun. 23, 2008, pp. 1-6.

* cited by examiner

METHOD AND A DEVICE FOR GENERATING A CONFIDENCE MEASURE FOR AN ESTIMATION DERIVED FROM IMAGES CAPTURED BY A CAMERA MOUNTED ON A VEHICLE

CROSS-REFERENCE TO RELATED APPLICATION

This application claims the benefit under 35 U.S.C. § 119(a) of European Patent Application EP 16162369.9, filed 24 Mar. 2016, the entire disclosure of which is hereby incorporated herein by reference.

TECHNICAL FIELD OF INVENTION

This disclosure generally relates to a method and a device for generating a confidence measure for an estimation derived from images captured by a camera mounted on a vehicle.

BACKGROUND OF INVENTION

Many sub-modules in the area of driver assistance systems, whether they are based on radar or cameras, have a certain chance of failure. In order to use their output signals in a vehicle wide system it is important to receive some sort of quality estimate in addition to the signal. This quality estimate should give the information if the signal is correct and within a certain accuracy bandwidth or not. Especially module estimating the ego-motion from a sensor like a monocular camera requires this important information.

The output of such a module is often used for applications like camera calibration or serves as an ego-motion input for the object trackers, e.g., for lane marking, vehicle and pedestrian trackers. In these applications a false input can lead to a false and crucial system reaction. The additional information for the signal quality is often termed as confidence.

SUMMARY OF THE INVENTION

It is an underlying object of the invention to provide a method to generate a meaningful confidence measure for an estimation derived from images captured by a camera mounted on a vehicle. It is further an object of the invention to provide a device for generating a confidence measure for an estimation derived from images captured by a camera mounted on a vehicle.

The object underlying the invention is satisfied by the features of the independent claims. Advantageous further developments and aspects of the invention are set forth in the dependent claims.

In one aspect of the invention a method of generating a confidence measure for an estimation derived from images captured by a camera mounted on a vehicle is provided. According to the method, in particular in a training mode or an offline mode, consecutive training images are captured by the camera while the vehicle is moving. In addition, ground-truth data are determined for the training images. Optical flow vectors are computed from the training images and for each of the training images a first output signal is estimated. The estimation is based on the optical flow vectors and the first output signal indicates an orientation of the camera and/or a change thereof. The orientation of the camera may be given by pitch and roll angles, and the change of the orientation of the camera may indicate ego-motion. For each of the training images the first output signal is classified either as a correct signal or as a false signal. The classification of the first output signal depends on how good the first output signal for the respective training image fits to the ground-truth data. In addition, for each of the training images optical flow field properties are determined, wherein the optical flow field properties are derived from the training images. A separation function is then generated that separates the optical flow field properties into two classes based on the classification of the first output signal.

After the separation function has been generated in the training mode or offline mode, the separation function can be used during runtime or in an online mode to provide a meaningful confidence measure for an estimation. During runtime consecutive images are captured by the same camera or another camera mounted on the same vehicle or another vehicle. In case another camera and/or another vehicle are used during runtime, the other camera and/or the other vehicle may be identically constructed as the camera and the vehicle, respectively, used during the training mode. Optical flow vectors are computed from the images captured during runtime and a second output signal is estimated for each of the images, wherein the second output signal indicates an orientation of the camera and/or a change thereof. The estimation is based on the optical flow vectors computed from the images captured during runtime while the vehicle moves. For each of the images captured during runtime, optical flow field properties are determined, wherein the optical flow field properties are derived from the training images captured during runtime. In particular, the optical flow field properties determined during runtime are of the same sort as the optical flow field properties determined in the training mode. A confidence signal is generated for each of the second output signals by using the determined optical flow field properties and the separation function. For example, the optical flow field properties may be divided into the two classes by using the separation function that was generated in the training mode. In this case the confidence signal depends on the class of the optical flow field properties of the respective image.

In one embodiment, at least some of the second output signals are filtered. The confidence signal may be used as a weighting factor for the second output signal of the respective image during filtering. Further, the confidence signal for each of the second output signals may be used to decide whether the respective second output signal is used for filtering. It may be provided, for example, that only the second output signals are filtered which have a high confidence. In particular, a Kalman filter is used for the filtering.

The results of the filtering step may be used to determine the orientation of the camera and/or a change thereof.

In a further embodiment, the optical flow field properties are derived in the training mode from the training images by carrying out the following steps. First a number of points are selected from one of the training images and corresponding points are selected from the subsequent training image. Optical flow vectors are defined, wherein each optical flow vector connects one of the points in the one training image to the corresponding point in the subsequent training image. Optical flow vectors are also defined for other training images in the same fashion. Further, an estimation error is calculated for each of the optical flow vectors. In particular, the estimation error is the error of the estimation of the first output signal. The optical flow vectors are written into a histogram for each training image, wherein the histogram for a respective training image represents the distribution of the calculated errors of the optical flow vectors. Since the first output signal of each of the training images has been classified as a correct signal or a false signal, the histogram for the respective training image can be classified in the same manner.

During runtime the optical flow field properties may be derived from the images captured during runtime in the same fashion as in the training mode. A number of points are selected from one of the images captured during runtime and corresponding points are selected from the subsequent image. Optical flow vectors are defined that connect the points in the one image and the corresponding points in the subsequent image. In addition, optical flow vectors are defined for other images captured during runtime. For each of the optical flow vectors an estimation error is calculated. In particular, the estimation error is the error of the estimation of the second output signal. The optical flow vectors are written into a histogram for each image. The histogram for a respective image represents the distribution of the estimation errors of the optical flow vectors.

The optical flow field properties derived from the images during runtime may be divided into the two classes, for example, true positives and true negatives, by using the separation function. Further, the confidence signals may be generated based on the optical flow field properties divided into the two classes.

The two classes may consist of one class that contains true positives and another class that contains true negatives.

The second output signal may comprise ego-motion estimates and the confidence signal may indicate ego-motion confidence. In particular, ego-motion estimation provides relative yaw, pitch and roll angles and translational parameters of the camera between two camera positions.

Further, the second output signal may comprise estimates of a pitch angle and a roll angle of the camera relative to a surface, in particular the road surface, and the confidence signal may indicate confidence of the pitch angle and the roll angle. It may be provided that the yaw angle is not estimated and thus the second output signal does not comprise an estimate of the yaw angle.

The separation function may be generated by means of machine learning techniques.

According to a further aspect of the invention a device for generating a confidence measure for an estimation derived from images captured by a camera mounted on a vehicle is provided. The device is configured to receive consecutive training images captured by the camera while the vehicle is moving; receive ground-truth data for the training images; compute optical flow vectors from the training images and estimate a first output signal based on the optical flow vectors for each of the training images, the first output signal indicating an orientation of the camera and/or a change thereof; classify the first output signal for each of the training images as a correct signal or a false signal depending on how good the first output signal fits to the ground-truth data; determine optical flow field properties for each of the training images derived from the training images; and generate a separation function that separates the optical flow field properties into two classes based on the classification of the first output signal.

The device may comprise the embodiments disclosed above in connection with the method of generating a confidence measure for an estimation derived from images captured by a camera mounted on a vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
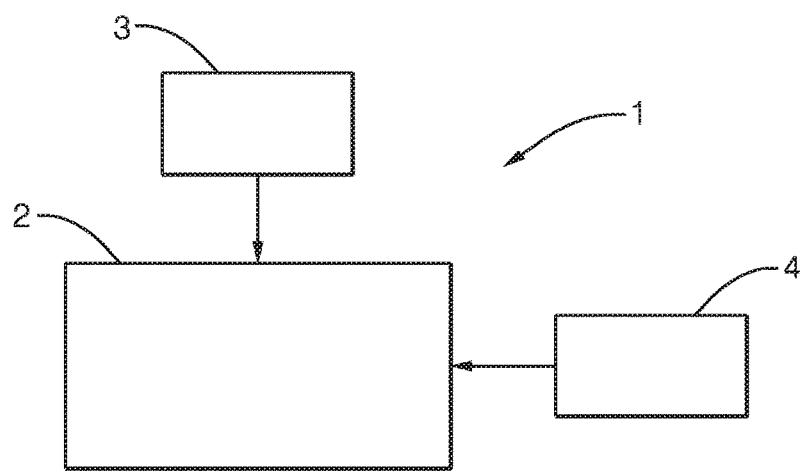
FIG. 1 is a schematic representation of a system and a device for confidence measurement for ego-motion estimation and filtering of ego-motion using the estimated confidence.

FIG. 1 illustrates a system 1 that allows confidence measurement for ego-motion estimation and filtering of ego-motion using the estimated confidence. The system 1 includes a device 2, a camera 3 and a velocity sensor 4. The camera 3 is mounted on a vehicle and captures images, for example, of the area in front of the vehicle. The velocity sensor 4 measures the velocity of the vehicle. The camera 3 and the velocity sensor 4 provide the device 2 with the captured images and the measured velocity data, respectively. The device 2 uses the captured images and the measured velocity data in order to estimate and output data regarding orientation and motion of the camera 3. For that purpose, the device 2 may include a processor and employs the algorithms explained in the following.

Figure 2:
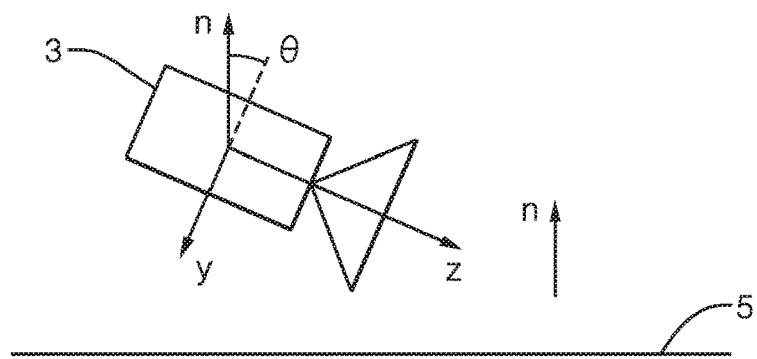
FIG. 2 is a schematic representation of a camera side view illustrating the geometry of the pitch angle θ.
Figure 3:
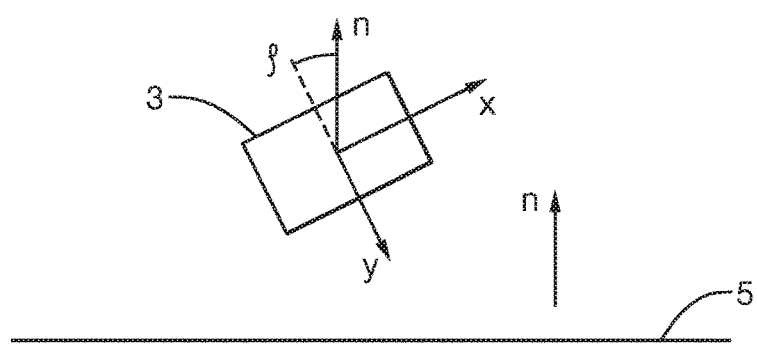
FIG. 3 is a schematic representation of a camera rear view illustrating the geometry of the roll angle ρ.

In the following the homography between two images captured by the camera 3 is explained, before the description of the confidence measurement for ego-motion estimation and filtering of ego-motion is continued. The homography between two images of the road surface 5 captured from successive poses of the moving vehicle includes information about the camera's roll and pitch angle relative to the road surface 5. The used coordinate system is defined in FIGS. 2 and 3, which show side and rear views of the camera 3, respectively. The coordinate system is fixed to the camera 3 and has orthogonal coordinates x, y and z. The normal vector of the road surface 5 is $n=[n_x, n_y, n_z]^T$. FIG. 2 shows the y-z-plane of the coordinate system where a pitch angle θ is defined as the angle between the projection of the normal vector n onto the y-z-plane and the y-axis. FIG. 3 shows the x-y-plane of the coordinate system where a roll angle ρ is defined as the angle between the projection of the normal vector n onto the x-y-plane and the y-axis. Further, a yaw angle Φ may be defined in the x-z-plane that is not illustrated in FIGS. 2 and 3.

Information about the pitch angle θ and the roll angle ρ is included in the homography which represents a projective transformation between two different images of the road surface 5 captured subsequently from two different positions of the camera 3. A homography matrix H is defined as follows in Eq. 1

$$H = K\left(R - \frac{tn^T}{d}\right)K^{-1},\qquad \text{Eq. 1}$$

and includes the intrinsic camera calibration matrix K, the distance d between the origin of the coordinate system of the camera 3 and the road surface 5, and the relative rotation R and translation t between the two camera positions. The metric translation t is calculated by t=t'vΔt consisting of a normalized translation vector t', the vehicle velocity v measured by the velocity sensor 4 and the time Δt elapsed between the two image captures.

The camera 3 captures consecutive images while the vehicle moves. Optical flow vectors are computed from an equally distributed feature grid overlaying the images. An optical flow vector linearly connects two points in two subsequently captured images which represent the same object in the world. For example, the camera 3 captures a first image and, subsequently after the time Δt, the camera 3 captures a second image. A first point from the first image and a second point from the second image are selected, wherein the first and second points represent the same object. The optical flow vector then connects the first point and the second point. For each image captured by the camera 3 such optical flow vectors are computed for each grid point.

The optical flow vectors are used for real-time ego-motion estimation that estimates rotational and translational parameters. In particular, ego-motion estimation provides a relative yaw angle ΔΦ, a relative pitch angle ΔΦ and a relative roll angle Δρ as well as translational parameters, for example $(T_x, T_y, 1)$ or $(T_x \cdot v\Delta t, T_y \cdot v\Delta t, v\Delta t)/\|(T_x, T_y, 1)\|_2$ if the vehicle's velocity v and the time Δt between two image captures are known, between two camera positions.

In order to generate a confidence signal, a signal definition is needed defining when a signal is correct or not. The definition can be made with the help of ground-truth. The ground truth can be obtained via approaches which promise more accurate parameter estimation, but in general need a lot of computation time, e.g. bundle adjustment, or by using an IMU (inertial measurement unit) sensor to create ground-truth, e.g. a 9-axis sensor. In particular, ground-truth data may be computed from the images captured during training mode by bundle adjustment. A sensor for accurately measuring ground-truth data is not necessary.

Ground-truth data for determining the pitch angle θ and the roll angle ρ are recorded in a different way. In this case, the camera orientation is accurately determined when the vehicle does not move. This camera orientation determination can be done by any static extrinsic camera calibration method which provides the pitch angle θ and the roll angle ρ. When the vehicle moves, the orientation of the camera 3 to the road surface 5 is assumed to be similar to the calibrated ground truth in a certain accuracy range.

In a training mode or offline mode, consecutive training images are captured by the camera 3 while the vehicle is moving and ground-truth data are recorded for the training images. For each of the training images a first output signal is estimated. For example, the first output signal indicates the pitch and roll angles of the camera orientation. The first output signals are estimated from the images captured by the camera 3. Since the ground-truth data provide the correct pitch and roll angles, every first output signal can be classified either as a correct signal or a false signal. The classification of the first output signals depends on how good the first output signal for the respective training image fits to the ground-truth data.

Figure 4:
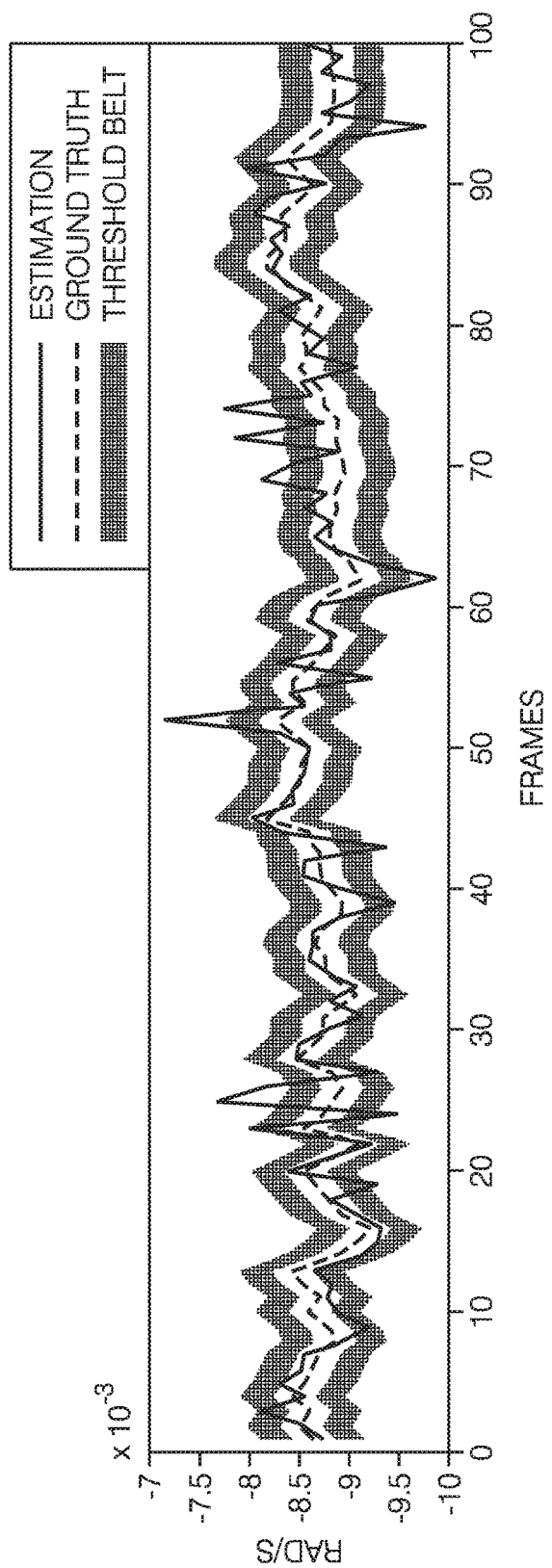
FIG. 4 is an illustration of a yaw angle derived from ground-truth data and a yaw angle estimated from the captured images.

FIG. 4 shows an example of the measurements and estimations carried out in the training mode for 100 frames/images. FIG. 4 illustrates the yaw angle derived from ground-truth data and the yaw angle estimated from the captured images for each frame. A threshold belt is defined with a pre-determined, constant distance from the ground-truth data to avoid unsecure data at the boundaries of the threshold. The threshold belt has two branches, one below and one above the ground-truth data. Both branches have a pre-determined, constant width and a pre-determined, constant distance from the ground-truth data. In the same manner the pitch and roll angles estimated from the images can be compared to threshold belts for the pitch and roll angles derived from ground-truth data.

Based on a comparison of the yaw, pitch and roll angles estimated from the images and the yaw, pitch and roll angles derived from ground-truth data, the first output signal is classified for each frame/image by separating the first output signals into two classes consisting of true positives and true negatives. In case at least one of the estimated yaw, pitch and roll angles for a given frame lies outside the respective threshold belt or inside the width of one of the two branches of the threshold belt, the first output signal of the respective image is classified as true negative. Only if all estimated yaw, pitch and roll angles for a given frame lie between the two branches of the respective threshold belt and do not touch the branches of the threshold belt, the first output signal of the respective image is classified as true positive.

By the separation into two classes, a clear definition of a correct signal and a false signal could be established on a training set. In the next step the definition is generalized for unknown data during runtime. For the generalization, a novel classification method is created to identify whether the outputs from the camera based motion sensor are correct or not. For the confidence generation a feature set is created, which makes use of the data which is generated from the visual odometry sensor anyway.

The feature set created for confidence measurement may consist of optical flow field properties that are determined for each of the training images. Optical flow vectors are computed for every point in the grid and the computational errors, in particular the epipolar errors, are estimated for every optical flow vector. For each image, the estimated errors of the optical flow vectors are written in a histogram.

A non-negative set of thresholds S is defined. The thresholds S define the bins of the histogram. Each bin of the histogram indicates the number of the optical flow vectors in the respective image that have an error which is within the range associated with the respective bin. In particular, for every optical flow feature pair (x, x') we evaluate the objective E(x, x', Ω, T) from which we already computed the ego-motion and choose the minimum threshold such that E or –E (if E is negative) is smaller than S. These results are written into the histogram, which is further normalized using the amount of all feature pairs.

Figure 5:
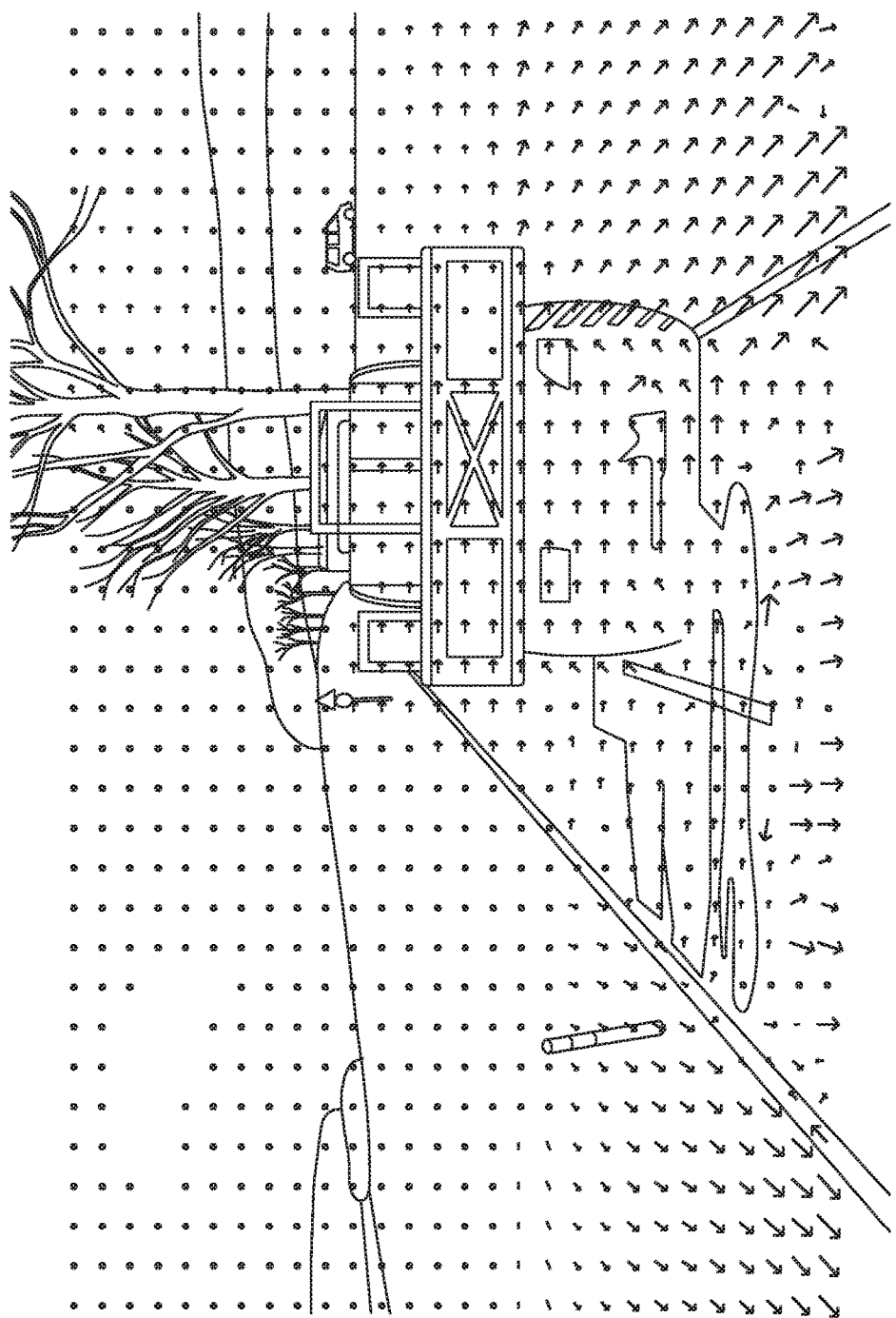
FIG. 5 is a schematic representation of an image with optical flow vectors computed for this image.

FIG. 5 schematically shows an image captured by the camera 3 with a grid overlaying the image. FIG. 5 also shows the optical flow vectors computed for this image at the grid points. The estimation error has been calculated for every optical flow vectors. The optical flow vectors having a lighter color are inliers of a particular bin of the histogram, i.e., the estimation error calculated for these optical flow vectors is smaller than the threshold S associated with the particular bin. The optical flow vectors having a darker color are outliers of the bin.

Besides the localized histograms of inliers (pyramidal), the feature set may comprise orientation histograms of angles between the reprojection of the feature points from frame i to frame i+1 using the current ego-motion and the appropriate feature points in image i+1 (pyramidal).

The histogram of inliers can further been refined using a region based evaluation of the objective, i.e. a localized histogram of inliers. Here we divide the image in, for example, 4 regions of identical magnitude and compute the histogram mentioned above for every region. This approach can be continued for every region to get smaller regions, i.e. more levels. The normalization can now be different and computed either region based (number of features in the region) or global (number of all features).

Since the first output signal of each of the training images has been classified as either true positive or true negative, optical flow field properties, in particular the histograms, derived from each image can be classified in the same manner. In other words, the optical flow field properties of each training image are classified as either true positive or true negative in accordance with the classification of the respective first output signal. The optical flow field properties determined for a respective training image can be represented by a point in a multidimensional space. A separation function is generated that separates the optical flow field properties into two classes, i.e. true positives and true negatives, based on the classification of the first output signal.

Using all or a selection of the aforementioned optical flow field features mentioned above a neural network or a linear SVM (support vector machine) or an SVM with radial basis function kernel is trained. It shall be noted that any other learning algorithm could be also used to generate the separation function.

As the data-set is really imbalanced and the amount of "bad data" is really low, if the ego-motion estimation performs well, we use additionally a weighting parameter for the true negatives to reduce the influence of this imbalance in Eq. 2

$$w_i = \frac{|\{x_i \mid f(x_i) = 1, i = 1 \ldots l\}|}{|\{x_i \mid f(x_i) = 0, i = 1 \ldots l\}|}, \quad \text{Eq. 2}$$

which show oversampling for every feature vector $x_i$.

The separation function that has been generated in the training mode allows to assess the accuracy of the estimated camera orientation parameters during runtime. During runtime, i.e., in the online mode, another camera and another vehicle may be used compared to the training mode, wherein the camera and the vehicle used during runtime are identically constructed as the camera and the vehicle, respectively, used in the training mode.

During runtime the camera 3 captures consecutive images while the vehicle is moving and, for each of the images, the same sort of optical flow field properties are derived from the images as in the training mode.

In the present embodiment, an optical flow vector is computed for each grid point of the grid overlaying the respective image. In addition, the computational errors of the optical flow vectors are estimated for every optical flow vector. For each image, the optical flow vectors are written in a histogram, wherein the thresholds S defining the bins of the histogram are identical to the thresholds S used in the training mode. If the optical flow field properties determined in the training mode comprise further features, e.g., orientation histograms of the direction/angles of the error between the reprojection of the feature points from frame i to frame i+1 and the related feature point in frame i+1 the same sort of features are also determined during runtime. For each image, the optical flow field properties are represented by a point in a multidimensional space. The optical flow field properties determined during runtime are divided into two classes, true positives and true negatives, by using the separation function generated in the training mode. A confidence signal can be generated for each image captured during runtime indicating whether the optical flow field properties determined for the respective image belong to the class of true positives or the class of true negatives.

During runtime, a second output signal is estimated for each of the images based on the captured images. The second output signal indicates an orientation of the camera and/or a change thereof, for example, the second output signal can include ego-motion estimates. The confidence signal is used to assess the accuracy of the second output signal.

Using a filter, in particular a Kalman filter, the device 2 smoothes the second output signals. As the output changes using this filter, the confidence also has to be propagated.

The confidence signal is used here to decide whether the respective second output signal can be used for subsequent filtering and the confidence belt used in the definition also gives information about the accuracy of the second output signal. For example, only true positives are used for filtering and all true negatives are discarded. The accuracy can be used for the filter as measurement covariance information, which is required from a Kalman filter. By defining additional confidence levels by extending the classification problem to different accuracy belts, one could also feed the raw signal into the filter with different covariance values.

If the filter parameters are selected in such a way, that the filter is consistent and false second output signals are rejected, a new confidence signal for the filter output can be generated from the confidence and signal inputs by evaluating the filter estimate covariance, e.g. by checking the determinant of the filter covariance in Eq. 2

$$\widetilde{conf}_k = \begin{cases} 1, & \bigwedge_i \left(n_i \cdot \det(\hat{P}_{k|k-1}^i) < \alpha_i\right) \\ 0, & \text{otherwise} \end{cases} \quad \text{Eq. 2}$$

Here the index i describes the i-th filter, as parameters of the ego-motion could be filtered separately. $\hat{P}_{k|k-1}^i$ is defined by the filter covariance. $\alpha_i$ is determined using the $\chi$-squared distribution and $n_i$ is a normalization factor given by the normal distribution.

Figure 6:
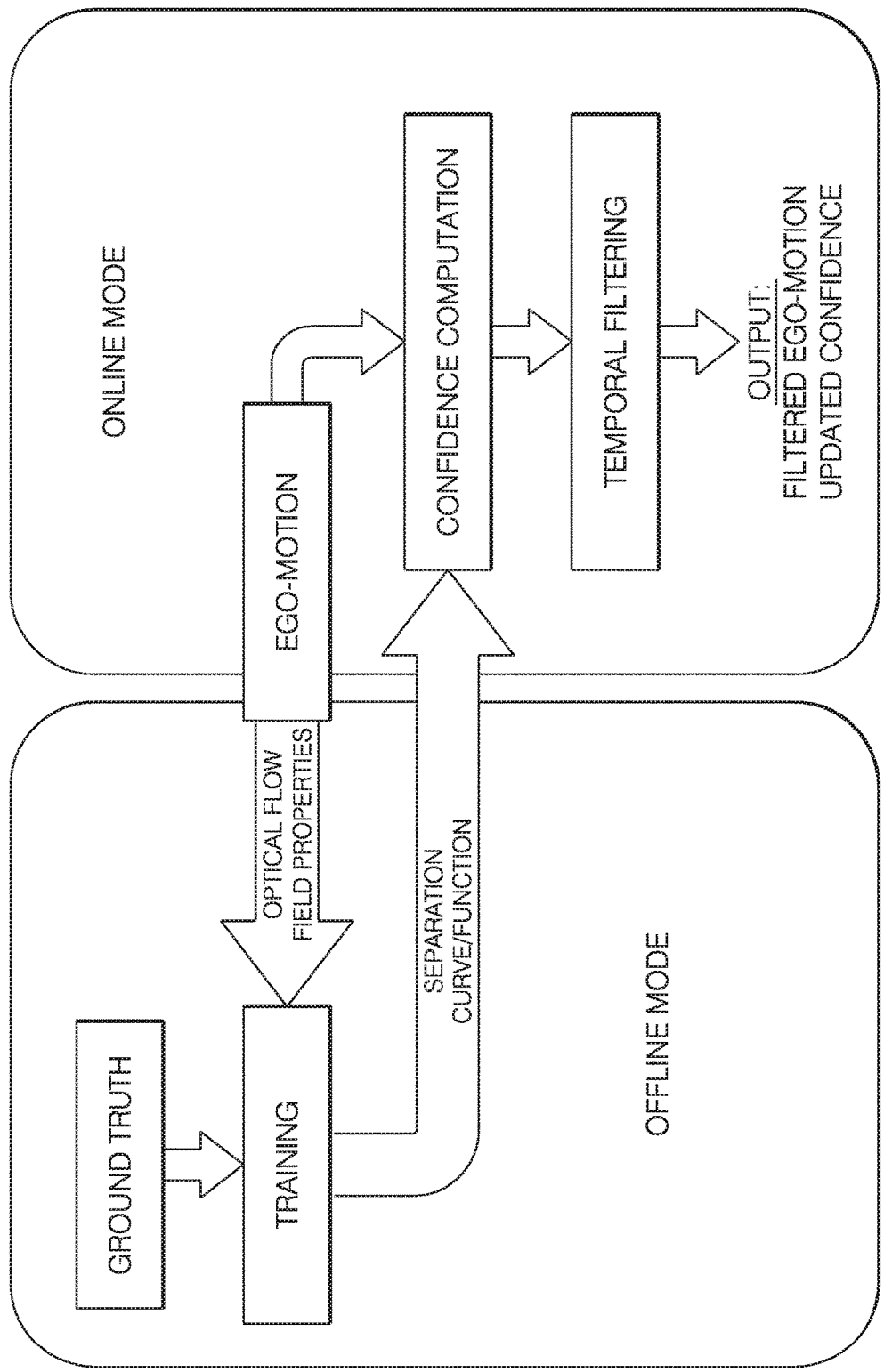
FIG. 6 is a schematic representation of the functions of the device for confidence measurement for ego-motion estimation and filtering of ego-motion using the estimated confidence.

FIG. 6 schematically summarizes the functions of the device 2 for confidence computation for ego-motion estimation and filtering of ego-motion using the estimated confidence.

Besides the calculation of ego-motion confidence a calculation of confidence for camera orientation estimation, e.g., the pitch and roll angles of the camera relative to the road surface, is possible as well. In this case, different or additional properties may be selected. Possible properties are ego-motion confidence, count of homography inliers, ratio of homography inliers to ego-motion inliers, position of centroid of the road plane inliers distribution and real world curve radius derived from yaw rate and vehicle velocity. All or a selection of the aforementioned properties may be used to derive the separation function.

The orientation of the camera 3 to the road surface 5 can be described by the homography matrix H given above by Eq. 1. Optical flow vectors serve as input data to estimate the pitch and roll angles by means of the homography matrix H. Count of homography inliers is the number of the optical flow vectors that fit to the estimation of the homography matrix H. Optical flow vectors that fit to the estimated homography matrix H within pre-determined error margins are inliers. The position of centroid of the road plane inliers distribution can indicate a shift of the centroid of the road plane inliers relative to the center of the images.

Ground truth data for classifier training can be obtained by any static extrinsic camera calibration method. The trained classifier is able to assess the accuracy of the estimated camera orientation angles. In particular, estimated camera orientation angles which overshoot a certain threshold corridor (difference between estimation and ground truth) get a low confidence, camera orientation angles inside this threshold corridor get a high confidence.

With this method we are able to determine if the orientation angle estimation for the current frame/image is useful/reliable or not. This confidence can also be used to improve online extrinsic camera calibration algorithms by removing frames with low confidence from the angle smoothing (over time) process.

While this invention has been described in terms of the preferred embodiments thereof, it is not intended to be so limited, but rather only to the extent set forth in the claims that follow.

We claim:

1. A method of generating a confidence measure for an estimation derived from images captured by a camera mounted on a vehicle, the method comprising:
    capturing consecutive training images by the camera while the vehicle is moving;
    determining ground-truth data for the training images;
    computing optical flow vectors from the training images;
    estimating a first output signal based on the optical flow vectors for each of the training images, the first output signal indicating an orientation of the camera;
    classifying the first output signal for each of the training images as a correct signal or a false signal, wherein the first output signal for each of the training images is classified as a correct signal in response to a determination that the first output signal differs from the ground-truth data by less than a threshold belt, wherein the threshold belt is defined by a constant distance from the ground-truth data;
    determining optical flow field properties for each of the training images derived from the training images; and
    generating a separation function that separates the optical flow field properties into two classes based on the classification of the first output signal.

2. The method as claimed in claim 1, comprising
    capturing consecutive images during runtime by the camera;
    computing optical flow vectors from the images captured during runtime and estimating a second output signal based on the optical flow vectors for each of the images, the second output signal indicating an orientation of the camera;
    determining optical flow field properties for each of the images derived from the images; and
    generating a confidence signal for each of the second output signals by using the determined optical flow field properties and the separation function.

3. The method as claimed in claim 2, comprising
    filtering at least some of the second output signals, wherein the confidence signal for each of the second output signals is used as a weighting factor of the respective second output signal.

4. The method as claimed in claim 2, comprising
    filtering at least some of the second output signals, wherein the confidence signal for each of the second output signals is used to decide whether the respective second output signal is used for filtering.

5. The method as claimed in claim 3, comprising
    determining the orientation of the camera using results of the filtering step.

6. The method as claimed in claim 1, wherein determining the optical flow field properties from the training images includes
    selecting a number of points from one of the training images and corresponding points from the subsequent training image;
    defining optical flow vectors connecting the points in the one training image and the corresponding points in the subsequent training image;
    defining optical flow vectors for other training images;
    calculating an error for each of the optical flow vectors; and
    writing the optical flow vectors into a histogram for each training image, the histogram representing the distribution of the calculated errors of the optical flow vectors.

7. The method as claimed in claim 2, wherein deriving the optical flow field properties from the images captured during runtime includes
    selecting a number of points from one of the images and corresponding points from the subsequent image;
    defining optical flow vectors connecting the points in the one image and the corresponding points in the subsequent image;
    defining optical flow vectors for other images;
    calculating an error for each of the optical flow vectors; and
    writing the optical flow vectors into a histogram for each image, the histogram representing the distribution of the calculated errors of the optical flow vectors.

8. The method as claimed in claim 2, comprising
    dividing the optical flow field properties derived from the images during runtime into the two classes by using the separation function; and
generating the confidence signal based on the optical flow field properties divided into the two classes.

9. The method as claimed in claim 8, wherein one of the two classes contains true positives and the other class contains true negatives.

10. The method as claimed in claim 9, wherein the second output signal comprises ego-motion estimates and the confidence signal indicates ego-motion confidence.

11. The method as claimed in claim 2, wherein the second output signal comprises estimates of a pitch angle and a roll angle of the camera relative to a surface and the confidence signal indicates confidence of the pitch angle and the roll angle.

12. The method as claimed in claim 11, wherein properties to derive the separation function comprise ego-motion confidence, count of homography inliers, ratio of homography inliers to ego-motion inliers, position of centroid of road plane inliers distribution and/or real world curve radius derived from yaw rate and vehicle velocity.

13. The method as claimed in claim 1, wherein the separation function is generated by means of machine learning techniques.

14. A device for generating a confidence measure for an estimation derived from images captured by a camera mounted on a vehicle, the device is configured to:
receive consecutive training images captured by the camera while the vehicle is moving; receive ground-truth data for the training images;
compute optical flow vectors from the training images;
estimate a first output signal based on the optical flow vectors for each of the training images, the first output signal indicating an orientation of the camera;
classify the first output signal for each of the training images as a correct signal or a false signal, wherein the first output signal for each of the training images is classified as a correct signal in response to a determination that the first output signal differs from the ground-truth data by less than a threshold belt, wherein the threshold belt is defined by a constant distance from the ground-truth data;
determine optical flow field properties for each of the training images derived from the training images; and
generate a separation function that separates the optical flow field properties into two classes based on the classification of the first output signal.

15. The device as claimed in claim 14, the device is configured to:
capture consecutive images during runtime by the camera;
compute optical flow vectors from the images captured during runtime;
estimate a second output signal based on the optical flow vectors for each of the images, the second output signal indicating an orientation of the camera;
determine optical flow field properties for each of the images derived from the images; and
generate a confidence signal for each of the second output signals by using the optical flow field properties and the separation function.

16. The device as claimed in claim 15, the device is configured to:
filter at least some of the second output signals, wherein the confidence signal for each of the second output signals is used as a weighting factor of the respective second output signal.

17. The device as claimed in claim 15, the device is configured to:
filter at least some of the second output signals, wherein the confidence signal for each of the second output signals is used to decide whether the respective second output signal is used for filtering.

18. The device as claimed in claim 17, the device is configured to:
determine the orientation of the camera using results of the filtering step.

19. The device as claimed in claim 14, wherein the device is configured to determine the optical flow field properties from the training images by:
selecting a number of points from one of the training images and corresponding points from the subsequent training image;
defining optical flow vectors connecting the points in the one training image and the corresponding points in the subsequent training image;
defining optical flow vectors for other training images;
calculating an error for each of the optical flow vectors; and
writing the optical flow vectors into a histogram for each training image, the histogram representing the distribution of the calculated errors of the optical flow vectors.

20. The device as claimed in claim 15, wherein the device is configured to derive the optical flow field properties from the images captured during runtime by:
selecting a number of points from one of the images and corresponding points from the subsequent image;
defining optical flow vectors connecting the points in the one image and the corresponding points in the subsequent image;
defining optical flow vectors for other images;
calculating an error for each of the optical flow vectors; and
writing the optical flow vectors into a histogram for each image, the histogram representing the distribution of the calculated errors of the optical flow vectors.

21. The device as claimed in claim 15, the device is configured to:
divide the optical flow field properties derived from the images during runtime into the two classes by using the separation function; and
generate the confidence signal based on the optical flow field properties divided into the two classes.

22. The device as claimed in claim 21, wherein one of the two classes contains true positives and the other class contains true negatives.

23. The device as claimed in claim 22, wherein the second output signal comprises ego-motion estimates and the confidence signal indicates ego-motion confidence.

24. The device as claimed in claim 15, wherein the second output signal comprises estimates of a pitch angle and a roll angle of the camera relative to a surface and the confidence signal indicates confidence of the pitch angle and the roll angle.

25. The device as claimed in claim 14, wherein properties to derive the separation function comprise ego-motion confidence, count of homography inliers, ratio of homography inliers to ego-motion inliers, position of centroid of road plane inliers distribution and/or real world curve radius derived from yaw rate and vehicle velocity.

* * * * *